US010455971B2

(12) United States Patent
Laner

(10) Patent No.: US 10,455,971 B2
(45) Date of Patent: Oct. 29, 2019

(54) AUTOMATIC MACHINE FOR PREPARING COFFEE

(71) Applicants: PROCAFFE' S.P.A., Belluno (IT); Gerhard Laner, Treviso (IT)

(72) Inventor: Gerhard Laner, Treviso (IT)

(73) Assignee: PROCAFFE' S.P.A., Belluno (IT)

( * ) Notice: Subject to any disclaimer, the term of this patent is extended or adjusted under 35 U.S.C. 154(b) by 395 days.

(21) Appl. No.: 15/309,046

(22) PCT Filed: Aug. 8, 2014

(86) PCT No.: PCT/EP2014/067114
§ 371 (c)(1),
(2) Date: Nov. 4, 2016

(87) PCT Pub. No.: WO2015/169398
PCT Pub. Date: Nov. 12, 2015

(65) Prior Publication Data
US 2017/0071398 A1 Mar. 16, 2017

(30) Foreign Application Priority Data
May 7, 2014 (IT) .............................. MI2014A0829

(51) Int. Cl.
A47J 31/42 (2006.01)
A47J 31/36 (2006.01)
A47J 31/44 (2006.01)
(52) U.S. Cl.
CPC ........... *A47J 31/42* (2013.01); *A47J 31/3614* (2013.01); *A47J 31/3619* (2013.01); *A47J 31/4403* (2013.01)

(58) Field of Classification Search
CPC .. A47J 31/42; A47J 42/40; A47J 42/16; A47J 42/10; A47J 42/06
(Continued)

(56) References Cited
U.S. PATENT DOCUMENTS 1,390,008 A * 9/1921 Arduino .................. A47J 31/18
99/286
2,413,687 A * 1/1947 Bogoslowsky ......... A47J 31/42
426/433
(Continued)

FOREIGN PATENT DOCUMENTS

EP 2661997 4/2013
FR 2267073 A1 11/1975
(Continued)

OTHER PUBLICATIONS

International Search Report and Written Opinion, International application No. PCT/EP2014/067114, International filing date Aug. 8, 2014, dated Mar. 4, 2015.
(Continued)

Primary Examiner — Reginald Alexander

(57) ABSTRACT

An automatic machine for preparing coffee, comprising an infusion assembly, a water tank, a heat exchanger with associated pump, and a grinder for grinding coffee beans, the grinder being arranged in line with the infusion assembly and horizontally with respect to a resting surface of the machine, a container adapted to contain coffee beans being connected, in an upper region, to the grinder, the grinder being connected to a chamber adapted to contain a scraper, the ground coffee being adapted to pass horizontally from the grinder to the scraper, in order to accommodate within the scraper a preset dose of ground coffee.

10 Claims, 14 Drawing Sheets

(58) Field of Classification Search
USPC .......................................................... 99/286
See application file for complete search history.

(56) References Cited

U.S. PATENT DOCUMENTS

| | | | | |
|---|---|---|---|---|
| 4,659,023 | A * | 4/1987 | Frei | A47J 42/40 |
| | | | | 241/100 |
| 5,463,934 | A | 11/1995 | Locati | |
| 6,988,444 | B1 * | 1/2006 | Pfeifer | A47J 31/42 |
| | | | | 99/286 |
| 9,032,866 | B2 * | 5/2015 | White | A47J 31/04 |
| | | | | 99/280 |
| 9,198,535 | B2 * | 12/2015 | Righetti | A47J 42/40 |
| 9,795,243 | B2 * | 10/2017 | Rivera | A47J 31/085 |
| 2009/0031900 | A1 * | 2/2009 | Barraclough | A47J 31/057 |
| | | | | 99/280 |
| 2010/0199847 | A1 * | 8/2010 | Li | A47J 31/42 |
| | | | | 99/283 |
| 2013/0091802 | A1 * | 4/2013 | Bentley | A47J 42/26 |
| | | | | 53/111 R |

FOREIGN PATENT DOCUMENTS

| | | |
|---|---|---|
| GB | 1488446 A | 4/1975 |
| JP | 2005-177283 | 7/2005 |
| WO | 2007/135597 A1 | 11/2007 |
| WO | 2012/122118 A2 | 9/2012 |

OTHER PUBLICATIONS

Korean Office Action for Application No. 10-2016-7033595; dated Feb. 7, 2019.

* cited by examiner

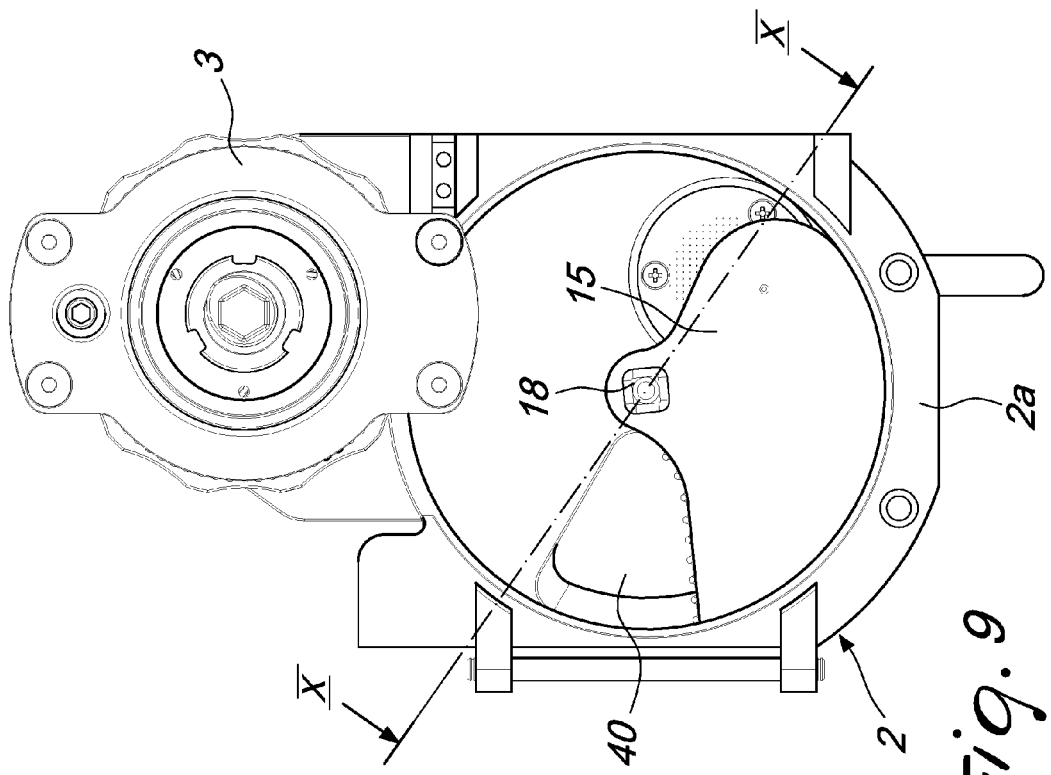
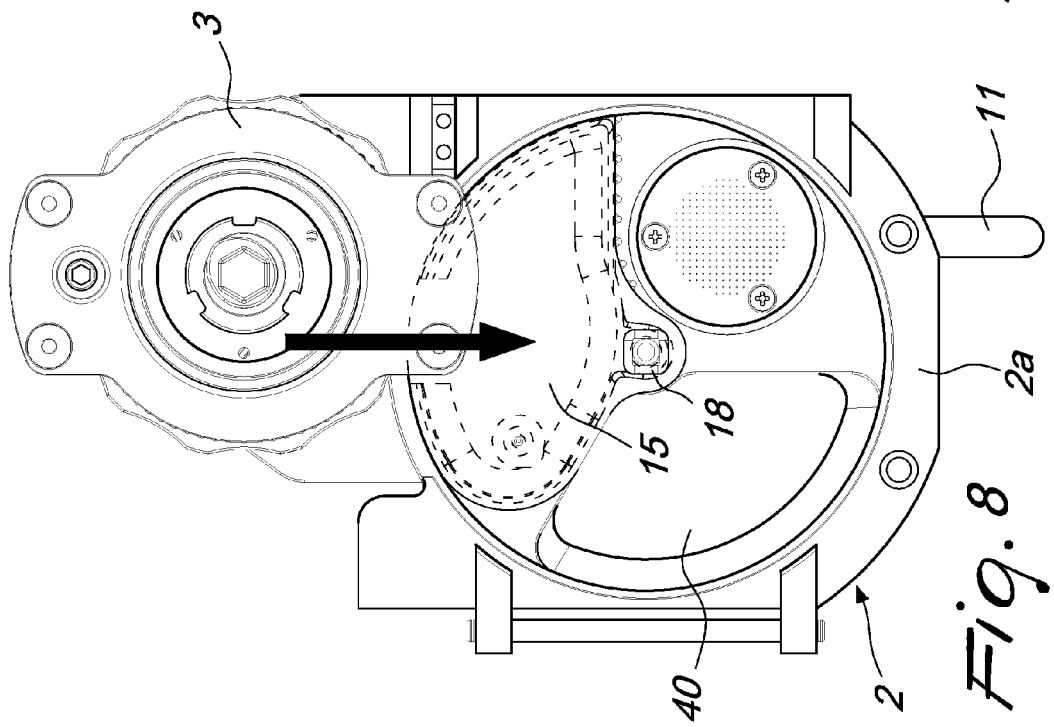

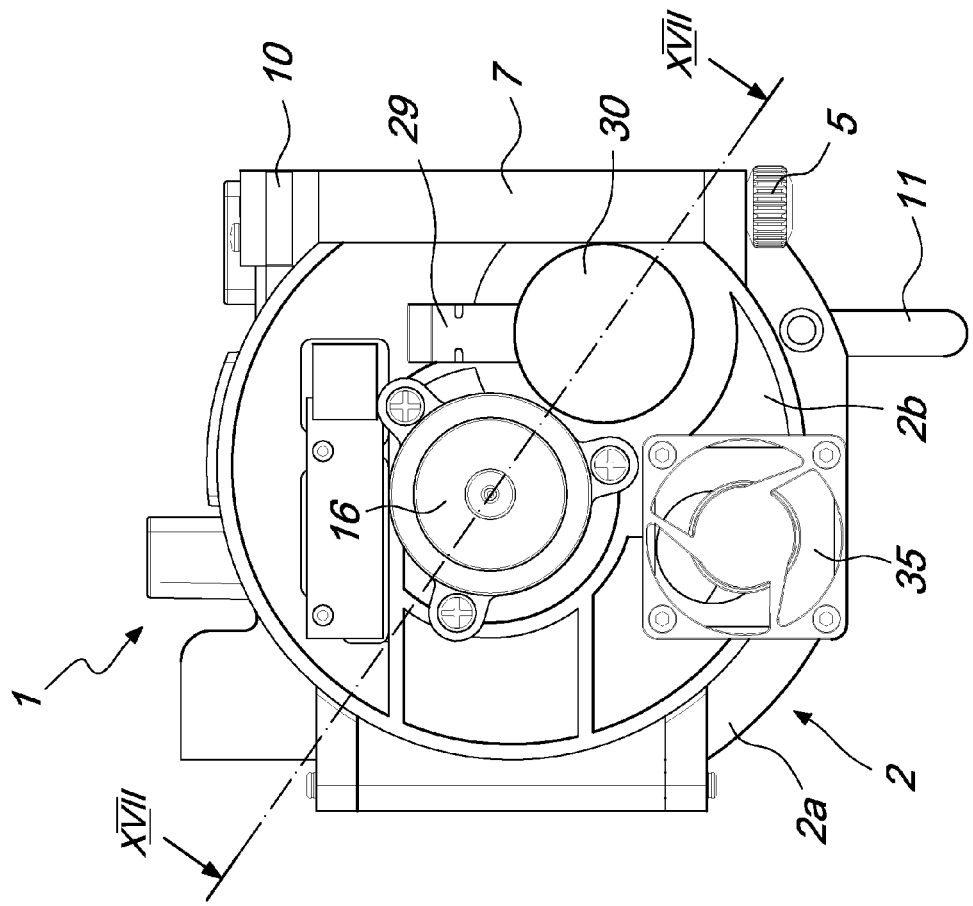
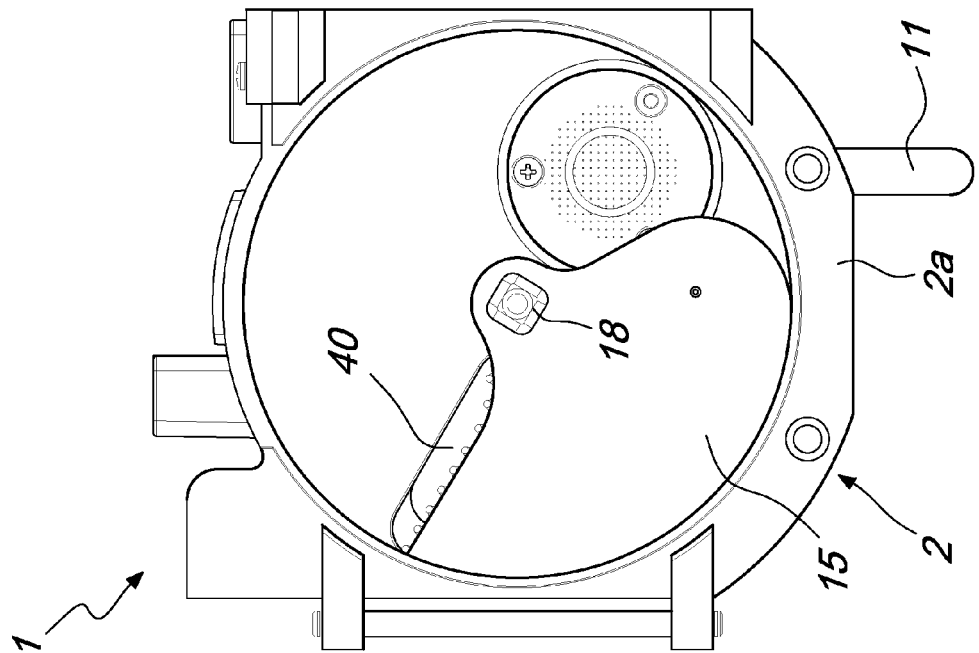

AUTOMATIC MACHINE FOR PREPARING COFFEE

The present invention relates to an automatic machine for preparing coffee. More specifically, the invention relates to an automatic machine for preparing coffee, starting from coffee beans inserted in a container and conveniently ground.

As is known, substantially two types of coffee machines for household use exist, one using capsules or pods and the other using ground coffee or coffee beans placed in a container arranged above the machine, conveniently ground, and then dispensed in powder form to the machine for the dispensing of the coffee.

Usually, the type of machine that uses coffee beans is considerably larger than the machines that use capsules and pods for dispensing the coffee.

Therefore, the type of machines that use coffee beans currently has a lower success rate than machines that use capsules and pods, precisely because the larger size of the machine can bring inconveniences for users who have limited space to accommodate it.

Furthermore, machines using capsules or pods are extremely simple to use, and they are just as simple in terms of ordinary maintenance (cleaning).

The aim of the present invention is to provide an automatic machine for preparing coffee from coffee beans, that has substantially similar space occupation characteristics to those of machines that use capsules or pods.

Within this aim, an object of the present invention is to provide an automatic machine for preparing coffee, that has an automatic disposal of the exhausted slug of coffee, similarly to what occurs in automatic machines that use capsules or pods.

Another object of the present invention is to provide an automatic machine for preparing coffee that is highly reliable, easily and practically implemented and low cost.

This aim and these and other objects which will become better apparent hereinafter are achieved by an automatic machine for preparing coffee, comprising an infusion assembly, a water tank, a heat exchanger with associated pump, and a grinder for grinding coffee beans, characterized in that said grinder is arranged in line with said infusion assembly and horizontally with respect to a resting surface of the machine, a container adapted to contain coffee beans being connected, in an upper region, to said grinder, said grinder being connected to a chamber adapted to contain a scraper, the ground coffee being adapted to pass horizontally from said grinder to said scraper, in order to accommodate within said scraper a preset dose of ground coffee.

Further characteristics and advantages of the invention will become better apparent from the description of a preferred, but not exclusive, embodiment of the machine according to the present invention, which is illustrated by way of non-limiting example in the accompanying drawings wherein:

FIG. 8 is a plan view of a detail of the infusion assembly in a first operative condition;

FIG. 9 is a plan view of a detail of the infusion assembly in a second operative condition;

FIG. 15 is a plan view showing a further operative condition of the infusion assembly;

FIG. 16 is a plan view of the infusion assembly;

Figure 1:
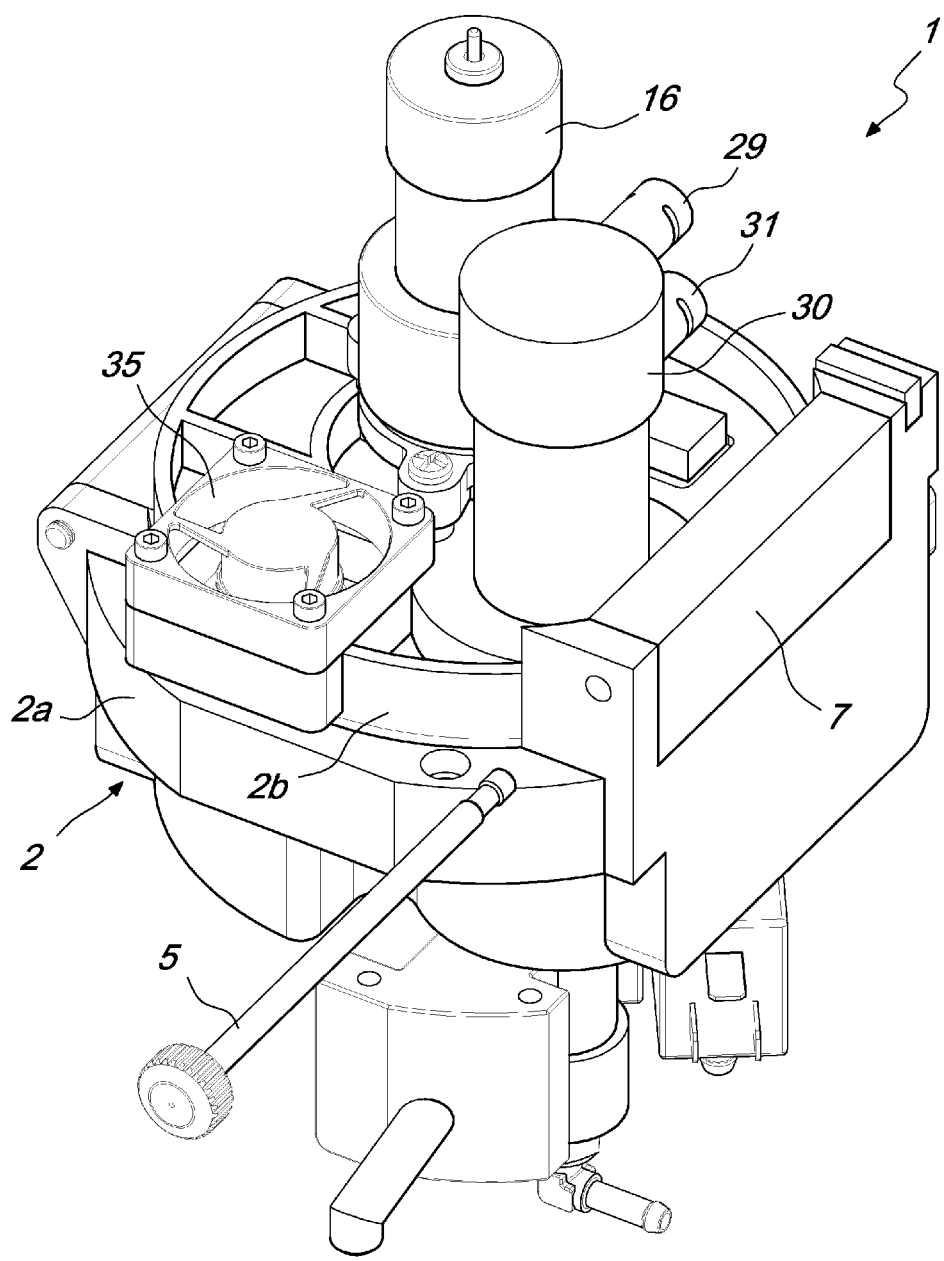
FIG. 1 is a perspective view, with an exploded detail, of the infusion assembly of the machine according to the present invention.
Figure 2:
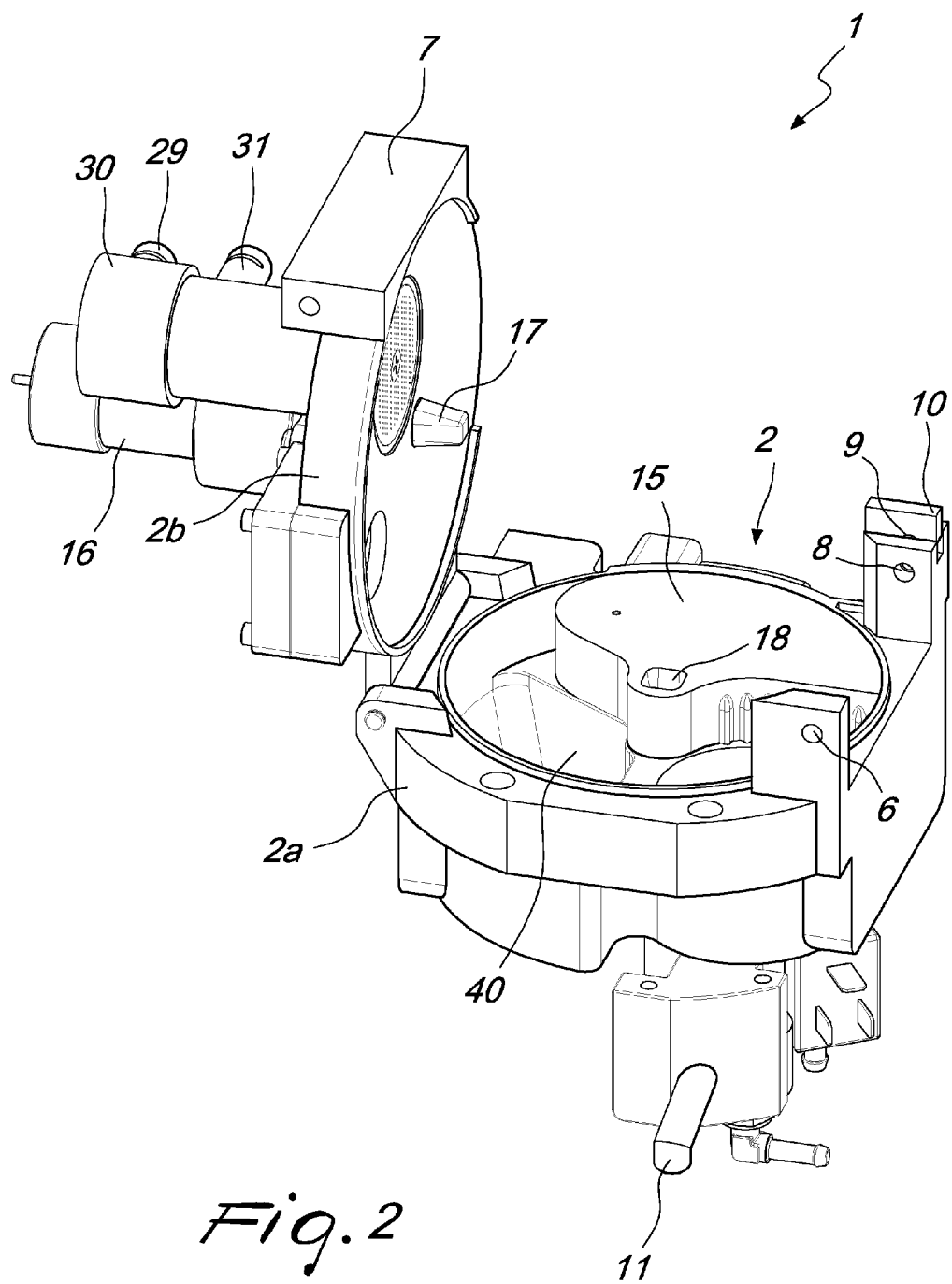
FIG. 2 is a perspective view of the infusion assembly of FIG. 1 in the open condition.
Figure 3:
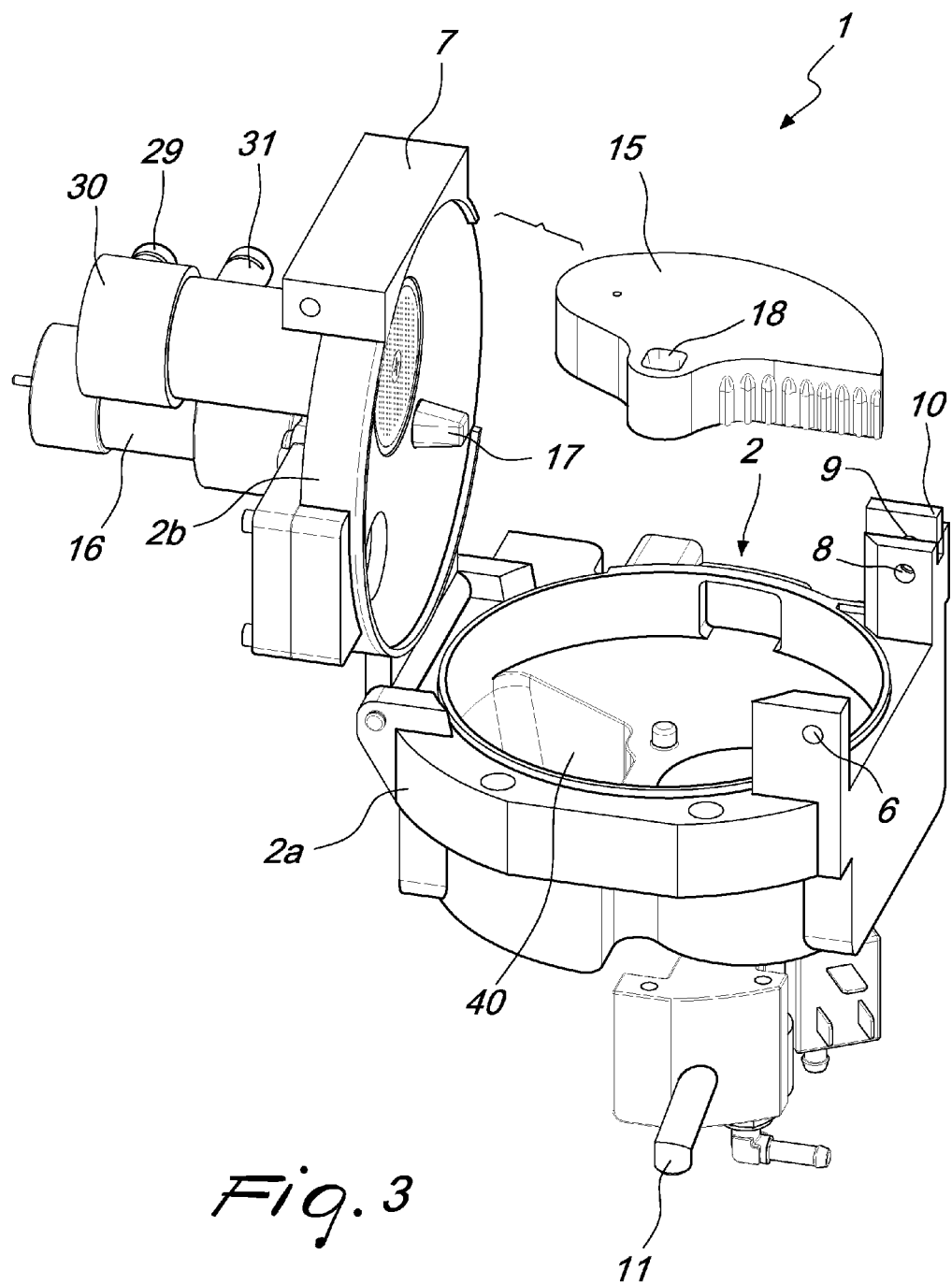
FIG. 3 is an exploded perspective view of the infusion assembly in FIGS. 1 and 2.
Figure 4:
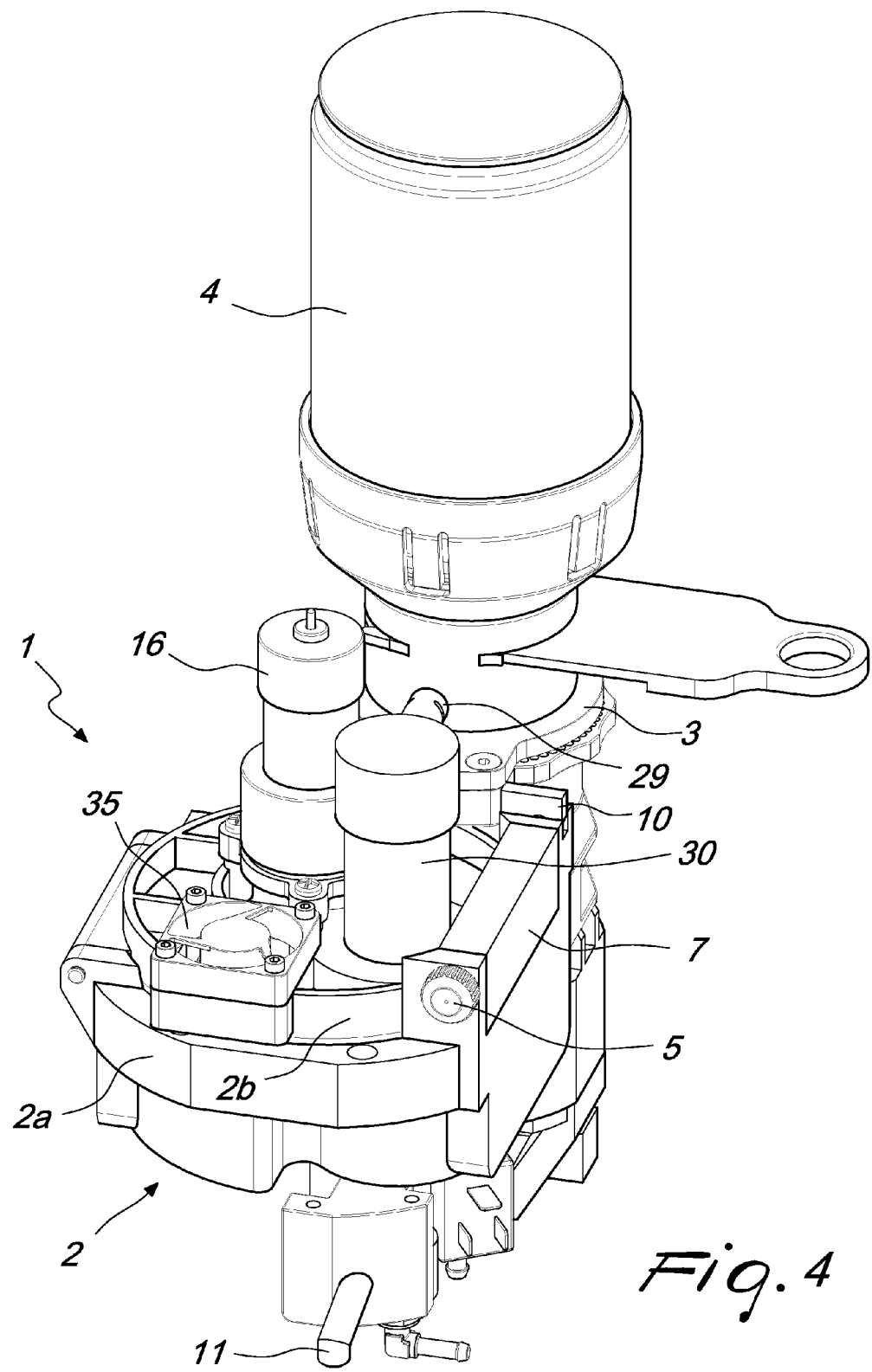
FIG. 4 is a perspective view of the infusion assembly in FIGS. 1, 2 and 3, with the container of coffee beans and the grinder.
Figure 5:
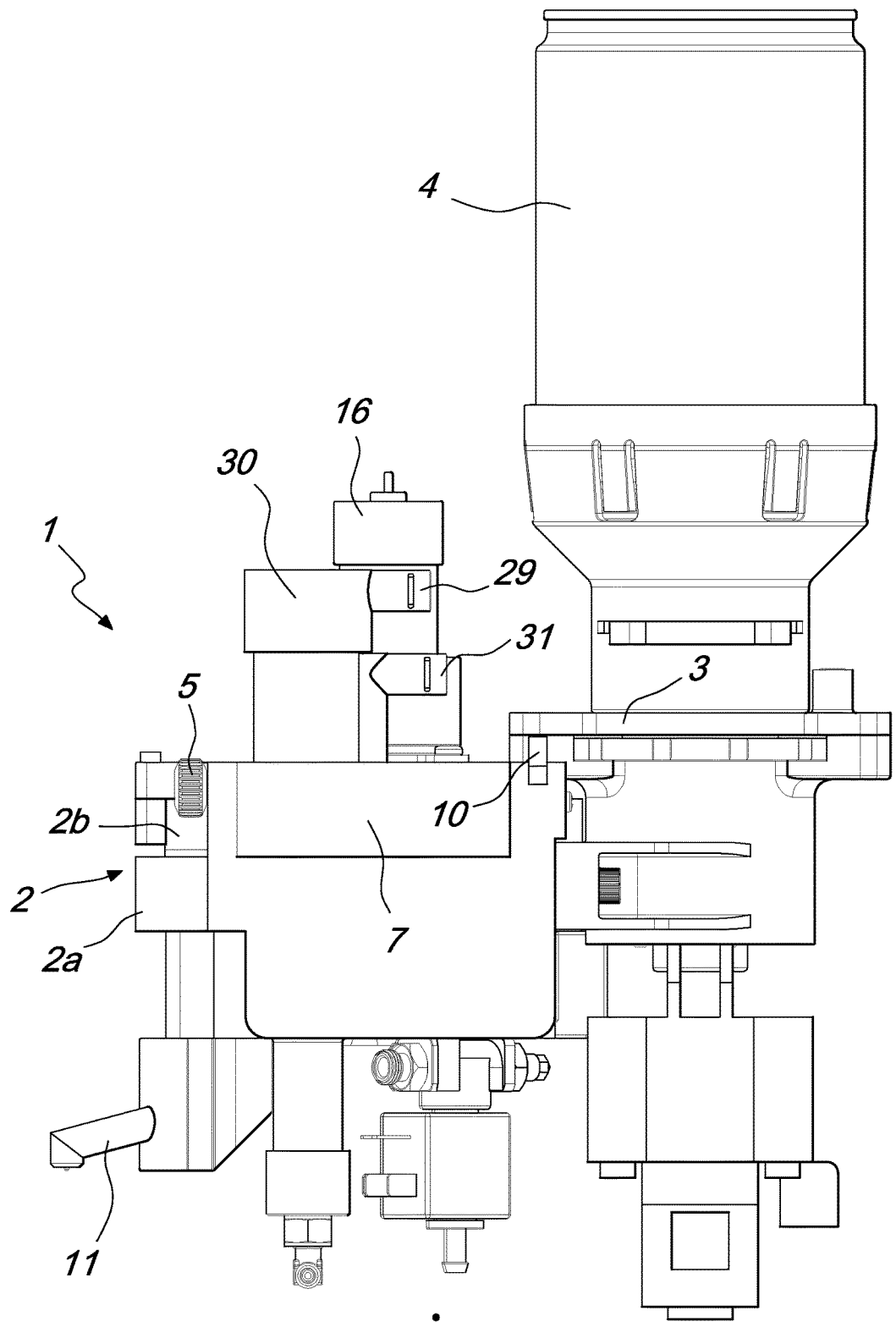
FIG. 5 is a side elevation view of the infusion assembly and the grinder with the container containing the beans which is shown in FIG. 4.
Figure 6:
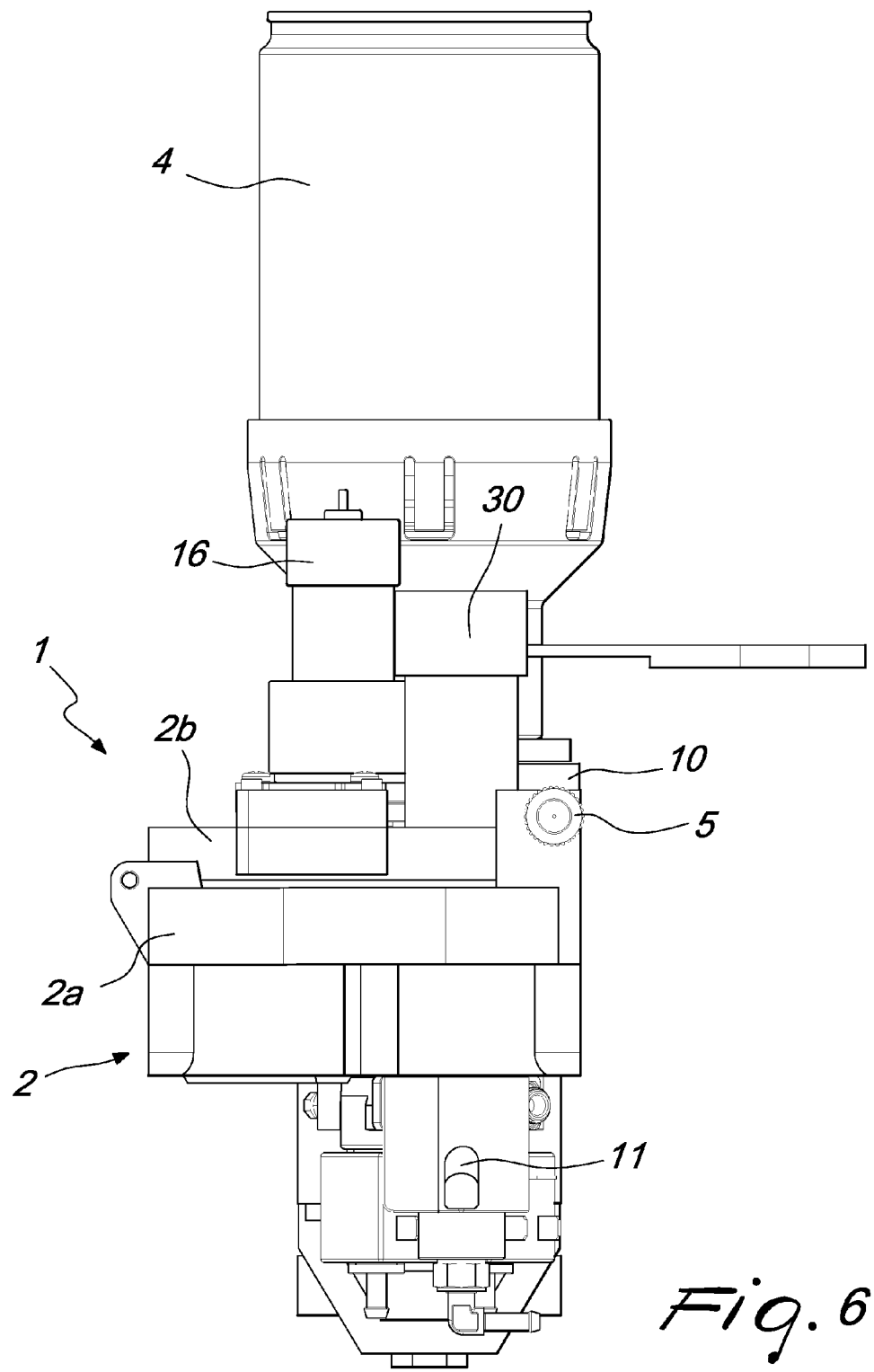
FIG. 6 is a further front elevation view of what is shown in FIGS. 4 and 5.
Figure 7:
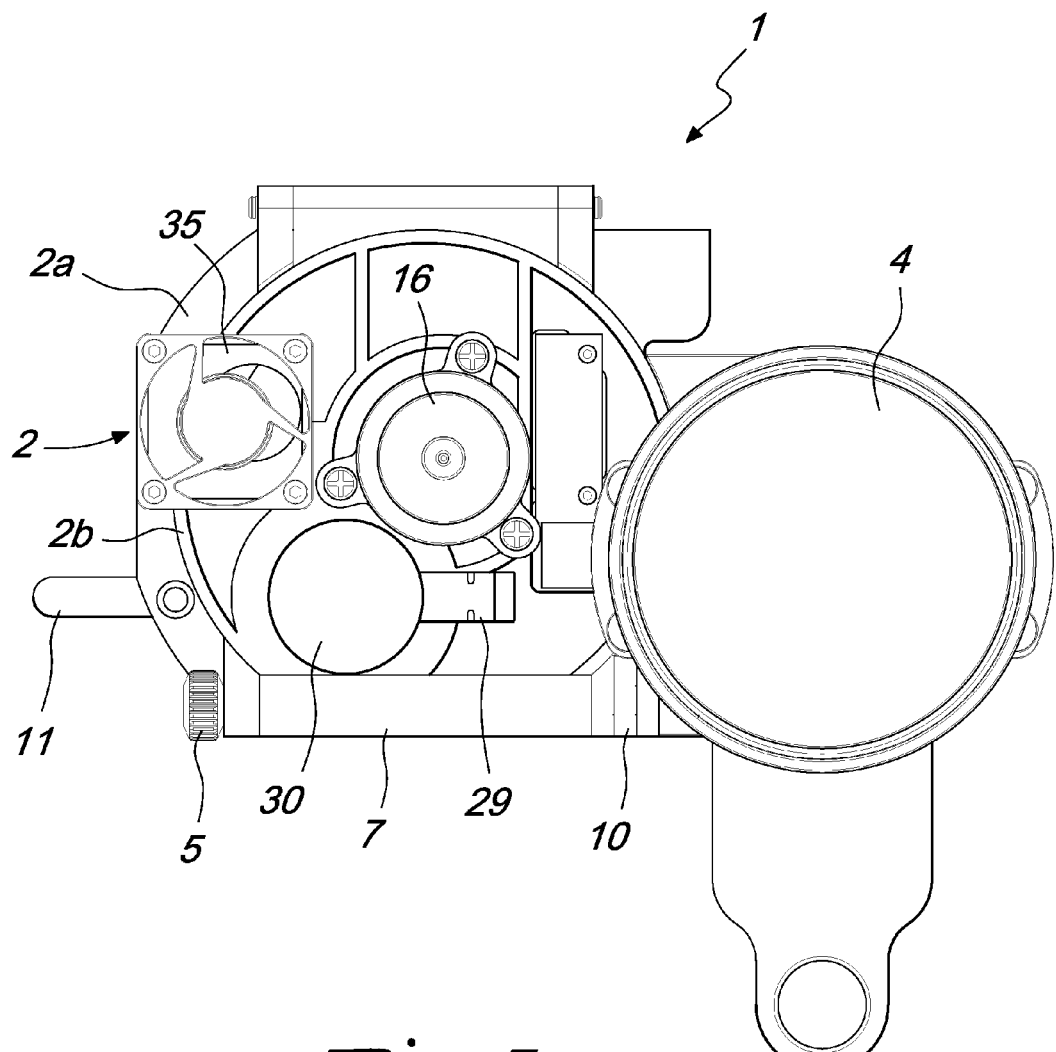
FIG. 7 is a plan view from above of what is shown in FIGS. 4, 5 and 6.
Figure 10:
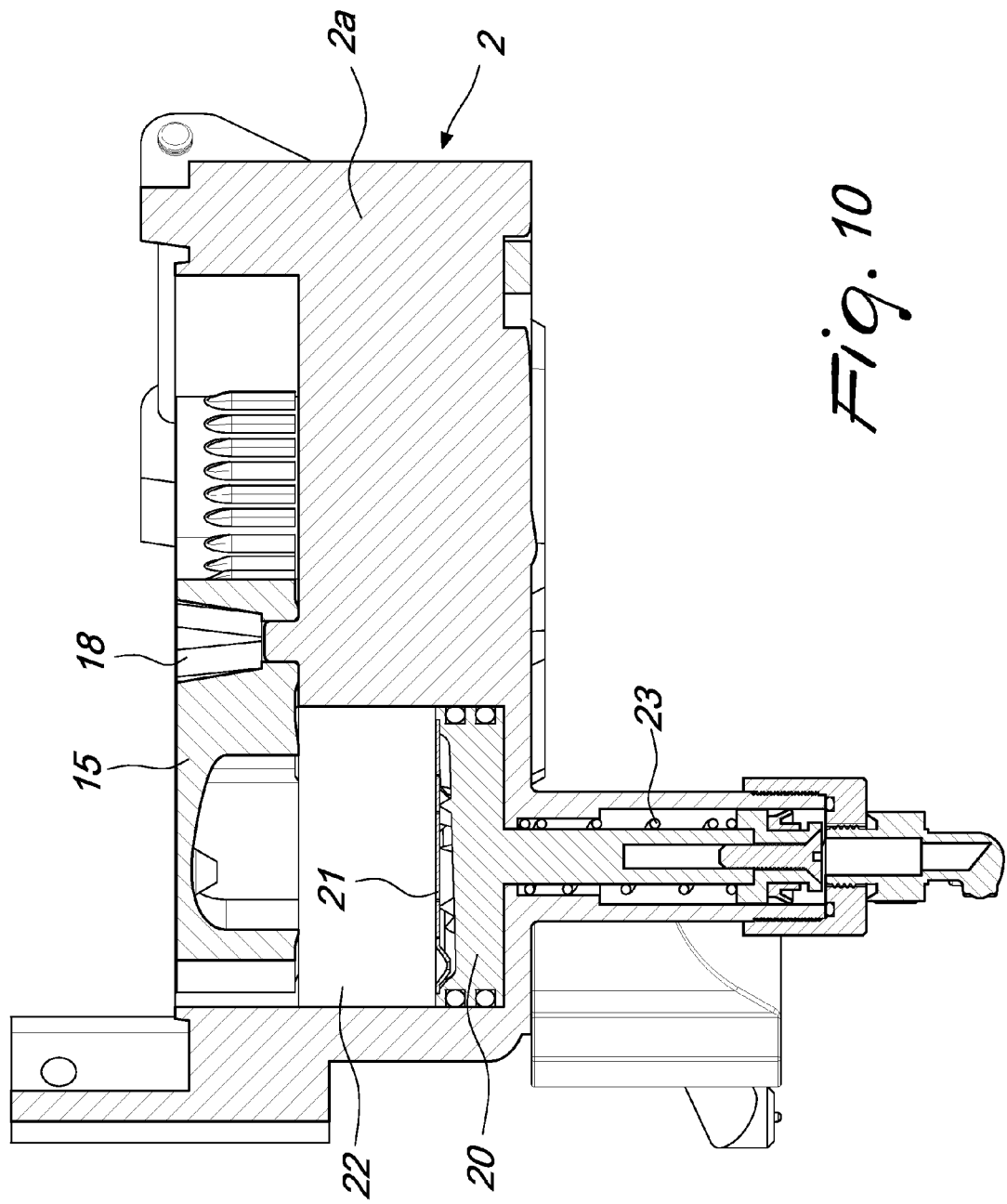
FIG. 10 is a sectional view taken along the axis X-X of FIG. 9.

With reference to the figures, the machine according to the invention, generally designated by the reference numeral 1, comprises an infusion assembly 2 that is adapted to be conventionally connected to a water tank, not shown, and to a heat exchanger, also not shown.

The infusion assembly 2 is accompanied by a grinder 3 that is adapted to grind coffee beans that are contained in a container 4 that is connected in an upward region to the grinder 3. The container 4 is adapted to allow the coffee beans to fall into the grinder 3 by gravity and the grinder 3 is adapted to grind the coffee until it becomes a powder that is then made to pass into the infusion assembly.

The infusion assembly 2 is constituted by a lower portion 2a that is pivoted (or otherwise connected) to an upper portion 2b with the upper portion 2b coming into abutment when closed against the lower portion 2a and being kept closed by way of locking means 5 that are conveniently constituted for example by a pin that is adapted to be engaged in a first hole 6 that is defined in the lower portion 2a and to pass through a portion 7 that is integral with the upper portion 2b, and to be engaged finally in a second hole 8 that is defined in the lower portion 2a, and to then engage a hole 9 that is defined in a button 10 that allows, once pressed, the engagement of the pin 5, and, once released, the locking of such pin with the consequent locking of the upper portion 2b in contact with the lower portion 2a.

The lower portion 2a of the infusion assembly 2 ends in a downward region with a dispensing spout 11 that enables the dispensing of a measure of coffee into an underlying vessel, not shown.

The lower portion 2a defines, together with the upper portion 2b of the infusion assembly 2, an infusion chamber within which is accommodated a scraper 15 that is actuated by actuation means 16, by way of engagement of a pin 17 of the actuation means 16 in a hole 18 of the scraper 15.

The scraper 15 is adapted to rotate within the infusion chamber, as will be described in more detail hereinafter.

The grinder is conveniently arranged in a lateral position with respect to the infusion chamber that accommodates the scraper 15, so that the grinder 3 is substantially aligned horizontally with the infusion chamber and the passage of ground coffee from the grinder to the scraper occurs in a linear fashion, horizontally with respect to the resting surface of the machine.

The lower portion 2a of the infusion assembly 2 is provided with a dispensing piston 20, which is provided in an upward region with a plate 21.

The dispensing piston 20 can move within a chamber 22 that defines the infusion chamber proper, together with the upper portion where the scraper 15 is accommodated.

The piston 20 is actuated hydraulically and can move in contrast against elastic means 23.

The upper portion 2a of the infusion assembly 2 is in turn provided with an infusion piston 25, which is provided with a plate 26 that is adapted to be opposed to the plate 21 of the dispensing piston 20. A duct 27 is defined in the dispensing piston 20 and leads to the dispensing spout 11, for the dispensing of the coffee into a vessel, not shown.

The infusion piston 25 is also moveable in opposition to elastic means 28.

The infusion piston 25 is actuated hydraulically, by way of the introduction of water into a duct 29 that is defined in the upper portion of the housing 30 of the piston 25.

A further duct 31 enables the passage of hot water, originating from a heat exchanger, not shown, which makes it possible, by passing through a duct 32, which is defined in the body of the infusion piston 25, to spray the ground coffee that is present in the infusion chamber.

The upper portion 2b of the infusion chamber 2 is furthermore provided with a drying fan 35.

With reference to the figures, operation of the machine according to the invention is as follows.

Firstly, the operator presses a button for dispensing, not shown, and the machine actuates the grinder 3 which is loaded by gravity from the container 4 above, and the correct amount of ground coffee is pushed into the chamber where the scraper 15 is accommodated. FIG. 8 shows this condition, where the arrow in the figure indicates the passage of the ground coffee into the chamber that accommodates the scraper 15.

It should be noted that in FIG. 8 the reference numeral 40 designates a compartment for the passage of the discarded material to the adapted container, not shown, which is arranged in a position that lies below.

Once the grinding step is finished, the scraper 15, which is conveniently internally hollow, contains inside the correct amount of ground coffee, and it begins to rotate on the center axis, bringing the ground coffee above the chamber over the dispensing piston 20, i.e. in position above the plate 21.

This condition is shown in FIG. 9 where it can be seen that the scraper 15 has performed a rotation with respect to the condition that the scraper assumes in FIG. 8.

Once the scraper 15 reaches the correct point of rotation above the dispensing chamber defined above the dispensing piston 20, the scraper inverts its rotation and returns to a stand-by position, and at this point the infusion cycle proper begins: the infusion piston 25 with the corresponding plate 26 is lowered completely while the lower piston for dispensing 20, which is arranged opposite thereto, exerts a counter-pressure until a point of equilibrium is found.

Water is dispensed from the heat exchanger and through the duct 31 and thus the duct 32 sprays the ground coffee present in the infusion chamber.

Figure 12:
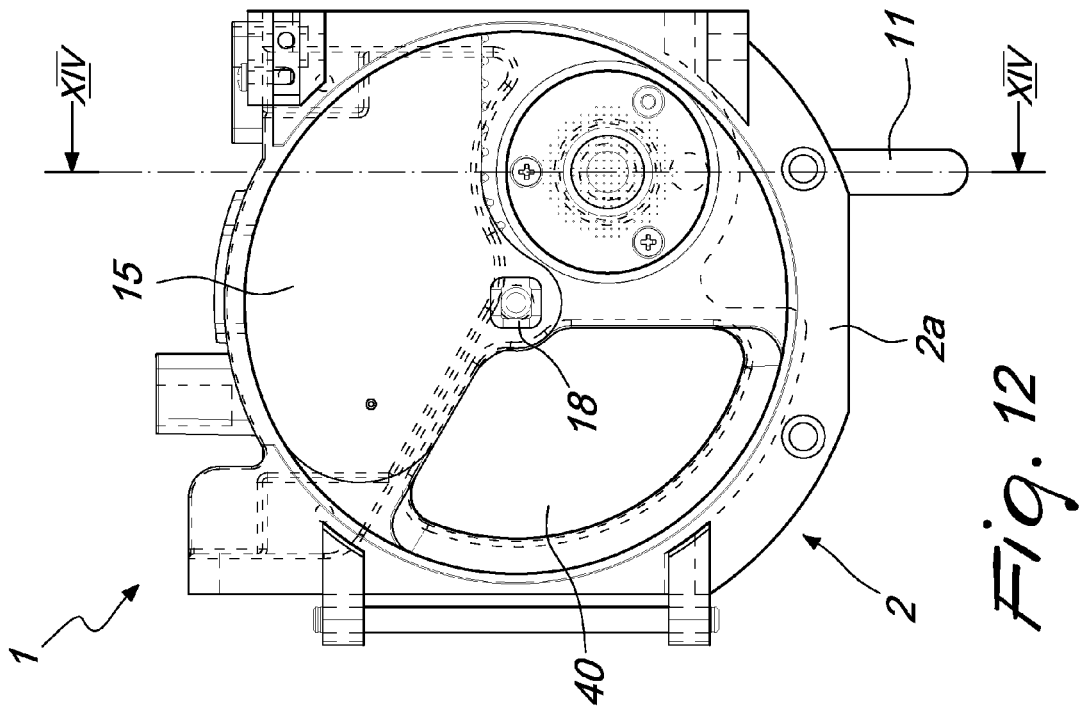
FIG. 12 is a plan view showing a third operative condition of the infusion assembly.
Figure 11:
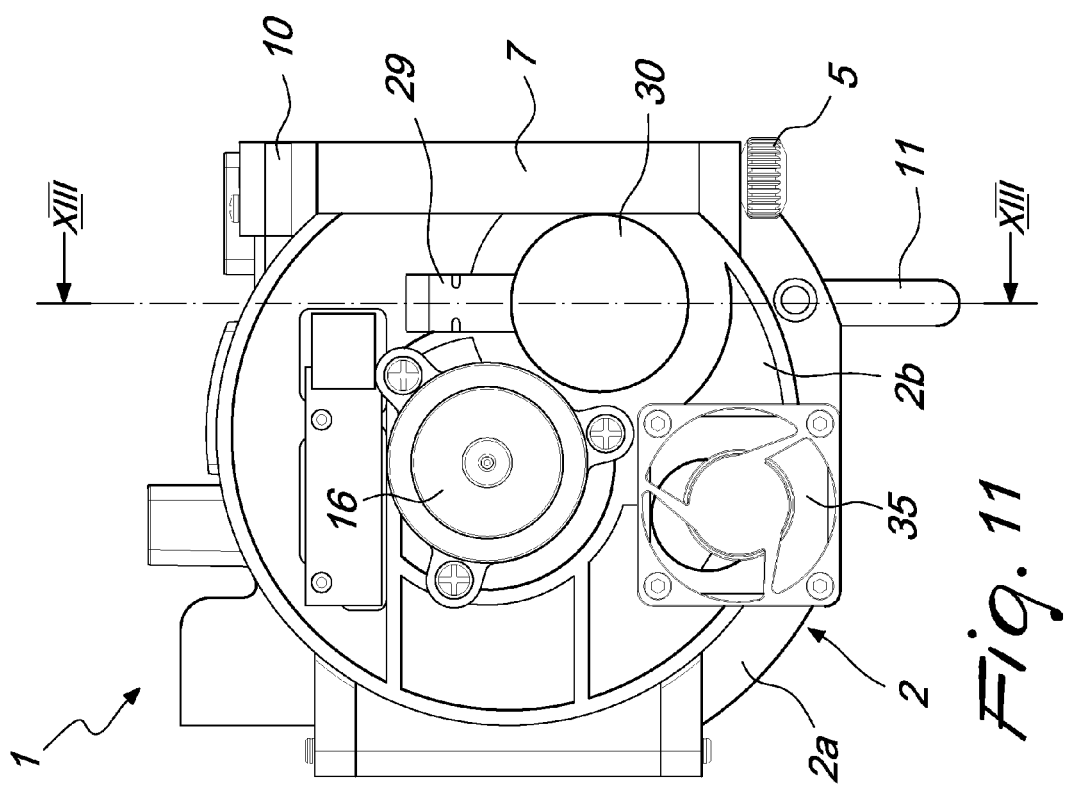
FIG. 11 is a plan view showing a detail of the infusion assembly.
Figure 13:
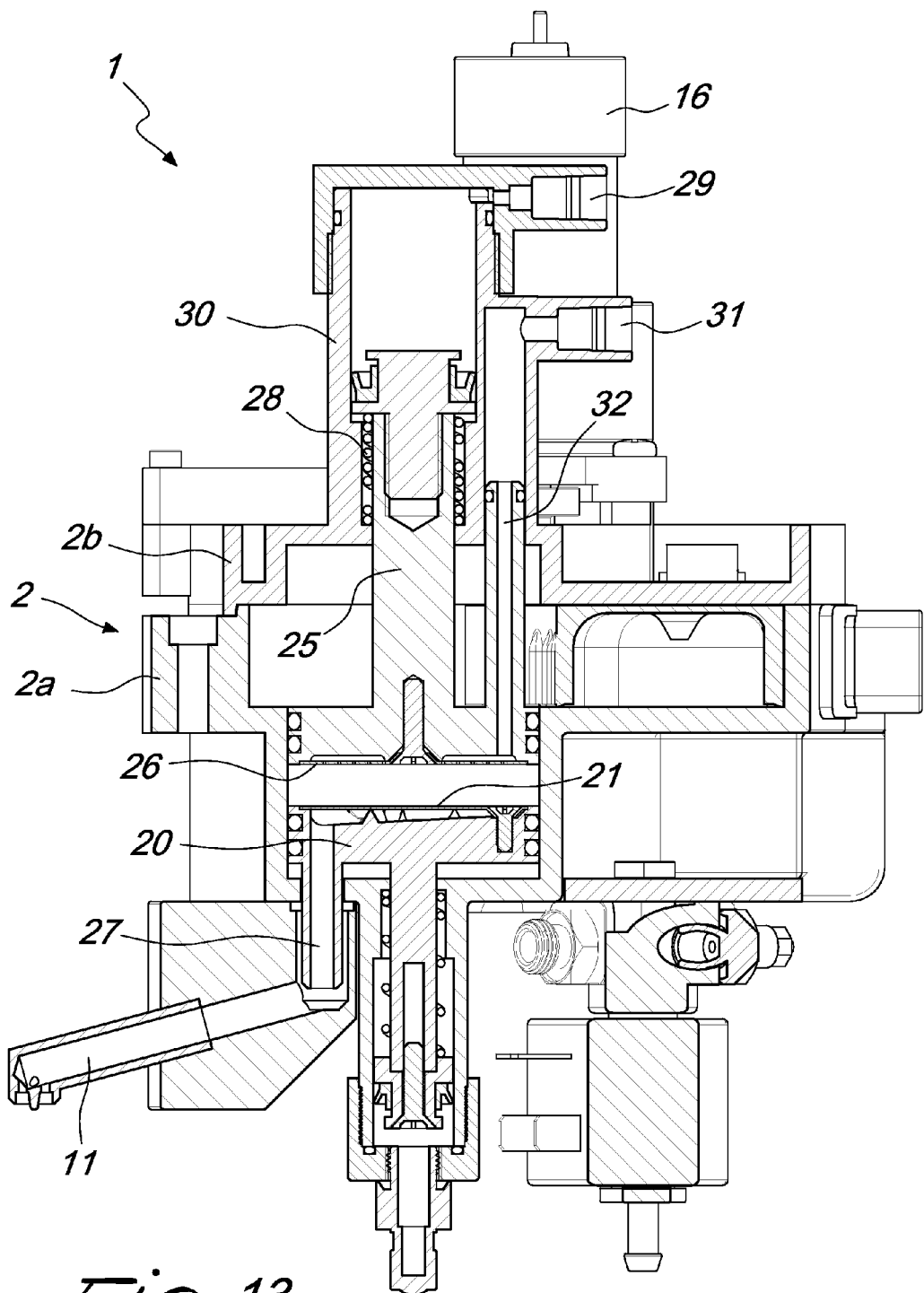
FIG. 13 is a sectional view taken along the axis XIII-XIII of FIG. 11.

FIG. 12 shows the scraper in the stand-by position, and FIG. 13 shows the condition in which the dispensing piston 20 and the infusion piston 25 approach each other, with ground coffee interposed (not shown).

Figure 14:
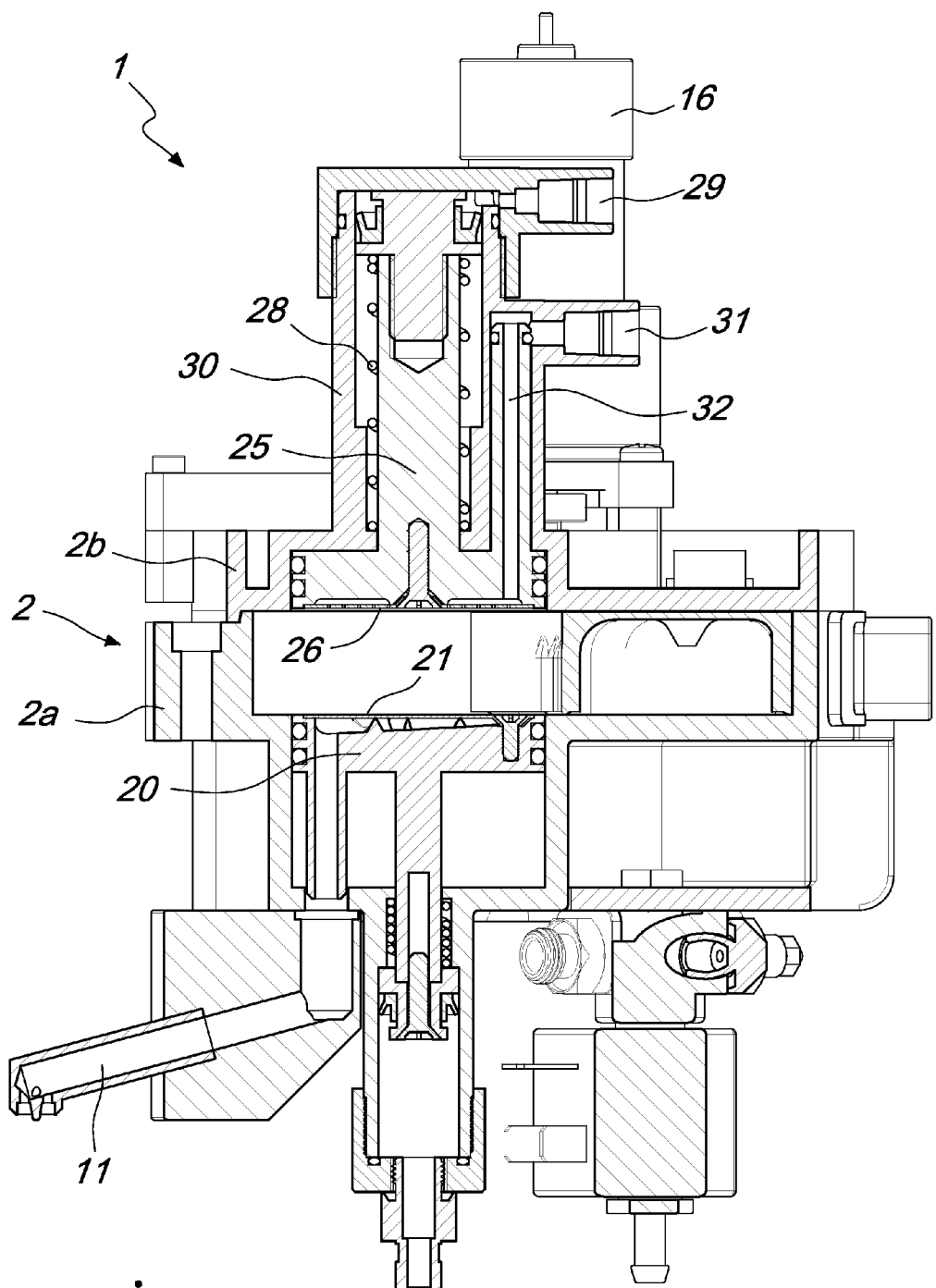
FIG. 14 is a sectional view taken along the axis XIV-XIV of FIG. 12.
Figure 17:
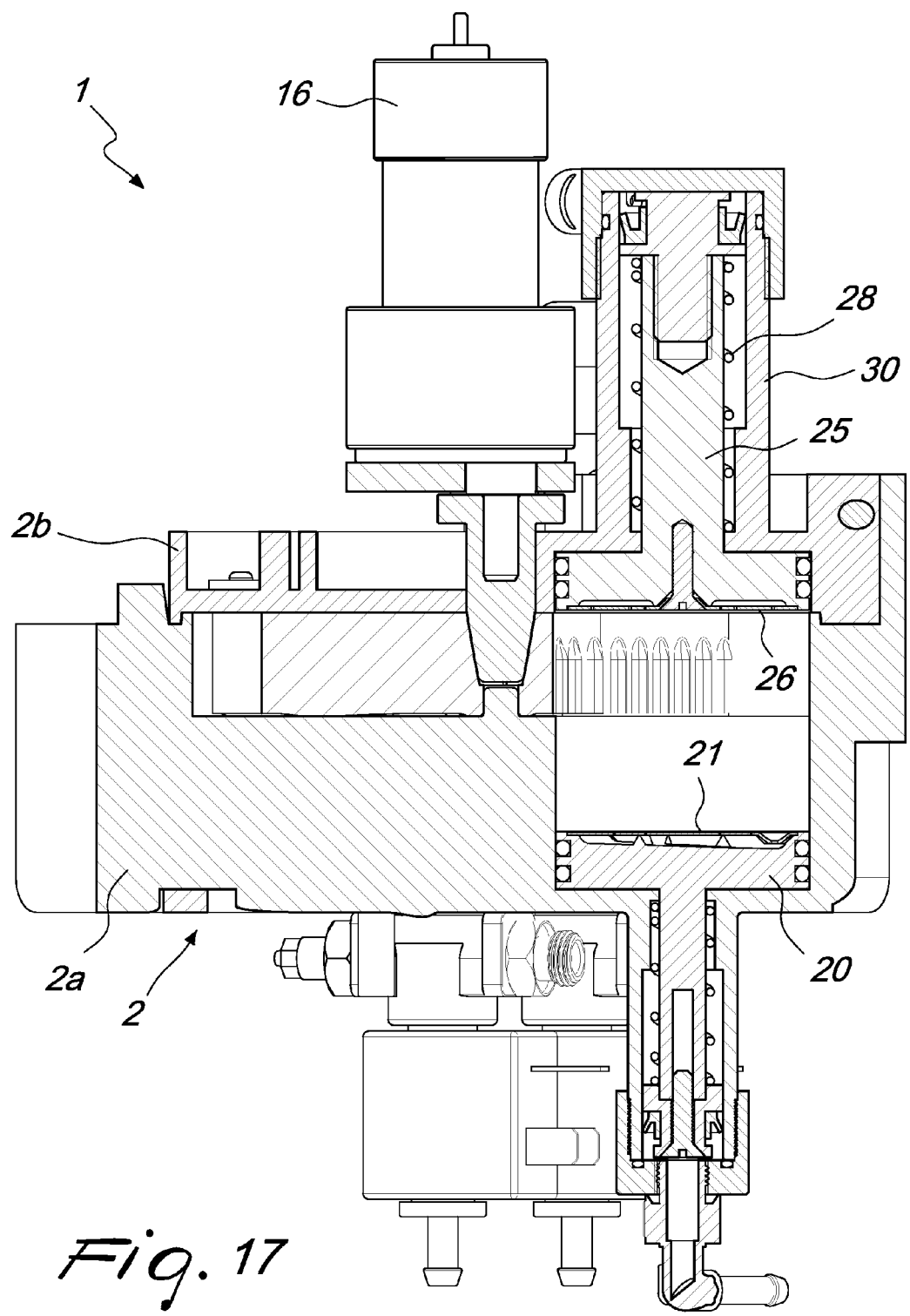
FIG. 17 is a sectional view taken along the axis XVII-XVII of FIG. 16.

Once the step of dispensing the coffee through the dispensing spout 11 is finished, the infusion piston 25 returns upwardly, as shown in FIG. 14, and after a few moments during which a drying step is performed by way of the fan 35, the plate 21 of the dispensing piston 20 rises to bring the slug of exhausted coffee to the level of the scraper 15. In this step the fan 35 for eliminating the water vapor inside the infusion assembly is always active.

At this point the scraper 15 rotates until it brings the exhausted slug to fall into the compartment 40 that leads to the drawer that contains the discarded coffee. This condition of the scraper 15 is shown in FIG. 15.

Subsequently, the scraper 15 returns once more to the stand-by position and the two pistons 20 and 25 have also returned to the stand-by position and the machine is ready for a subsequent dispensing of coffee.

In practice it has been found that the automatic coffee machine according to the present invention fully achieves the set aim and objects, in that it makes it possible, in extremely reduced spaces, to grind coffee beans and to dispense the coffee, utterly similarly to what occurs in an automatic machine with capsules or pods.

The machine, thus conceived, is susceptible of numerous modifications and variations, all of which are within the scope of the appended claims.

Moreover, all the details may be substituted by other, technically equivalent elements.

In practice the materials employed, and the contingent dimensions and shapes, may be any according to requirements and to the state of the art.

The disclosures in Italian Patent Application No. MI2014A000829 from which this application claims priority are incorporated herein by reference.

The invention claimed is:

1. An automatic machine for preparing coffee, comprising an infusion assembly, a water tank, a heat exchanger with associated pump, and a grinder for grinding coffee beans, wherein said grinder is arranged in line with said infusion assembly and horizontally with respect to a resting surface of the machine, a container adapted to contain coffee beans being connected, in an upper region, to said grinder, said grinder being connected to a chamber adapted to contain a scraper, the ground coffee being adapted to pass horizontally from said grinder to said scraper, in order to accommodate within said scraper a preset dose of ground coffee, wherein said scraper is adapted to rotate within said chamber, said chamber being defined by a lower portion and an upper portion of said infusion assembly, which are mutually pivoted and/or coupled.

2. The machine according to claim 1, wherein said scraper is moved by actuation means.

3. The machine according to claim 1, further comprising an infusion piston that is adapted to pass, in its movement, through said chamber of said scraper, and a dispensing piston, which is arranged below said infusion piston and is arranged opposite thereto, said infusion piston and said dispensing piston defining between them a space adapted to be occupied by said ground coffee, for the compression of said ground coffee between said infusion piston and said dispensing piston.

4. The machine according to claim 3, wherein said dispensing piston is provided with a duct that leads into a coffee dispensing spout.

5. The machine according to claim 3, wherein said infusion piston is provided with a duct that allows the passage of water that arrives from said heat exchanger, said water spraying said ground coffee interposed between said infusion piston and said dispensing piston.

6. The machine according to claim 1, wherein said chamber adapted to accommodate said scraper comprises a compartment for disposing of used ground coffee.

7. The machine according to claim 3, wherein said infusion piston and said dispensing piston are each provided with a respective plate, said ground coffee being pressed between said two plates.

8. The machine according to claim 1, further comprising a drying fan arranged above said chamber of said scraper.

9. An infusion assembly for an automatic coffee machine of the type that uses coffee beans, comprising a grinder for grinding coffee beans that is arranged in line with said infusion assembly and horizontally with respect to a resting surface of the machine, said grinder being connected in an upward region to a container adapted to contain coffee beans, said grinder being connected to a chamber adapted to contain a scraper, the ground coffee being adapted to pass horizontally from said grinder to said scraper for the accommodation, within said scraper, of a preset dose of ground coffee, wherein said scraper is adapted to rotate within said chamber, said chamber being defined by a lower portion and an upper portion of said infusion assembly, which are mutually pivoted and/or coupled.

10. The infusion assembly according to claim 9, further comprising an infusion piston that is adapted to cross, in its movement, said chamber of said scraper, and a dispensing piston, which is arranged below said infusion piston and is arranged opposite thereto, said infusion piston and said dispensing piston defining between them a space adapted to be occupied by said ground coffee, for the compression of said ground coffee between said two pistons.

* * * * *